United States Patent [19]

Martin

[11] 4,272,384

[45] Jun. 9, 1981

[54] COMPOSITION FOR PREVENTING A RESIN SYSTEM FROM SETTING UP IN A WELL BORE

[75] Inventor: Robert C. Martin, Tulsa, Okla.

[73] Assignee: The Dow Chemical Company, Midland, Mich.

[21] Appl. No.: 75,625

[22] Filed: Sep. 14, 1979

Related U.S. Application Data

[62] Division of Ser. No. 922,614, Jul. 7, 1978, Pat. No. 4,189,002.

[51] Int. Cl.$^3$ .......................................... E21B 33/138
[52] U.S. Cl. .............................. 252/8.55 R; 106/186; 166/295
[58] Field of Search .............................. 166/295, 281; 252/8.55 R, 8.55 B, 8.5 C; 106/186, 188

[56] References Cited

U.S. PATENT DOCUMENTS

| | | | |
|---|---|---|---|
| 3,134,436 | 5/1964 | Means et al. | 252/8.55 X |
| 3,308,884 | 3/1967 | Robichaux | 166/295 |
| 3,373,814 | 3/1968 | Eilers et al. | 166/294 X |
| 3,416,604 | 12/1968 | Rensvoid | 166/295 |

*Primary Examiner*—Herbert B. Guynn
*Attorney, Agent, or Firm*—L. W. White

[57] ABSTRACT

A zone of a subterranean formation penetrated by a well bore is permanently plugged by injecting a liquid resin system containing at least one thermosetting resin and at least one curing agent or catalyst therefor into the formation and injecting into the wellbore following the resin system, a second liquid containing at least one chain stopping compound to react with one component in the resin system to prevent any of the resin system remaining in the well bore from crosslinking to a sufficient crosslink density to form a solid in the wellbore. Preferably, the second liquid also contains a fluid loss additive to minimize loss of the second liquid from the wellbore to the formation. The method permits a zone to be plugged off and abandoned without the need to erect a drilling rig to drill out excess plugging material remaining in the wellbore. In a preferred embodiment, the resin system comprises the diglycidyl ether of bisphenol A and polymethylene phenylamine in ethylene glycol ethyl ether, and the preferred second liquid is monoethanolamine in ethylene glycol ethyl ether as a solvent with ethylcellulose and silica flour to control fluid loss.

8 Claims, No Drawings ial material which sets in the wellbore. For example, Robichaux, U.S. Pat. No. 3,308,884 teaches use of an amine catalyzed epoxy resin system for such a plugging operation, but teaches at column 7, lines 54–61 that after the resin has set, the remaining resin in the borehole can be drilled out and further drilling of the well can be resumed. The need to drill the material out of the wellbore significantly increases the cost of a treatment because of the need to erect a drilling rig—especially where an offshore well is involved.

COMPOSITION FOR PREVENTING A RESIN SYSTEM FROM SETTING UP IN A WELL BORE

CROSS-REFERENCE TO RELATED APPLICATION

This is a divisional, of application Ser. No. 922,614 filed July 7, 1978, now U.S. Pat. No. 4,189,002.

I. BACKGROUND OF THE INVENTION

A. Field of the Invention

The present invention relates to a method for plugging a zone of a subterranean formation penetrated by a wellbore. More particularly, it relates to a plugging technique utilizing a resin system containing a thermosetting resin and a curing agent or catalyst therefor in a single treatment stage. Another aspect of the invention is a treating fluid which may be utilized in one embodiment of the method.

B. Description of the Prior Art

In the production of oil and gas from subterranean formations, it is often found that water is produced with the hydrocarbons. Various techniques are known to selectively alter the permeability of the formation to improve the production of hydrocarbons relative to the production of water. Such techniques are not always successful however. Some may prove effective for a period of time, but eventually, the ratio of water:oil produced may become so high that production from that interval is no longer economically practical. In other instances, the water production may be so severe even initially that selective plugging techniques are not effective. When any of these conditions exists, it is desirable to plug that zone of the formation completely and permanently. Frequently, however, it is desired to produce from the same well at a different depth.

Various techniques have been proposed for permanently plugging a zone of a formation.

One technique which has been employed is to squeeze a cement slurry into the formation opposite the perforations adjacent the formation zone to be plugged. This technique requires waiting for the cement to set and thereafter drilling out the set cement remaining in the borehole. Furthermore, since the cement slurry contains a large amount of particulate material, it is not possible to obtain much depth of penetration into the formation.

Basically three approaches to chemically plugging a zone have been proposed. One approach is to consecutively inject into the formation, materials which react in situ to form a plug. A serious drawback of this technique, however, is that it is difficult to assure adequate mixing of the reactants since at least to some extent, one fluid tends to displace another within the formation rather to mix with it. A second approach to chemical plugging is to inject materials which will react with formation substances such as brine, sand particles, clays, or other materials naturally present in the formation. Again, however, the reliability of such techniques has not always been completely satisfactory.

The third basic approach to chemically plugging a formation has involved injecting previously mixed materials—e.g. a resin system containing both resin and a crosslinker or catalyst therefore in a single stage—into the formation where conditions such as time, temperature, and/or pressure will trigger a plug-forming reaction. A serious drawback of such systems, however, has been the need to come in with a drilling rig to clean out

II. SUMMARY OF THE INVENTION

The present invention is a method for permanently plugging a zone of a subterranean formation penetrated by a wellbore. In carrying out the method, a resin system containing at least one thermosetting resin and at least one curing agent or catalyst for the resin is injected into the formation via the wellbore. The resin system is displaced into the formation by a second liquid containing an effective amount of at least one chain stopping compound to react with at least one component of the resin system. Preferably, the second liquid also contains a fluid loss additive. The chain stopping or set inhibiting stage may be separated from the resin stage if desired, e.g. by a wiper plug, and is injected in a manner so that substantially none of the set inhibiting stage is itself injected into the formation. Reaction of any of the resin system remaining in the wellbore is thereby capped before sufficiently high crosslink density is achieved to form a solid residue in the wellbore. The liquid remaining in the wellbore can be removed at a later time, e.g. by recirculation to the surface, bailing, displacement into another zone, and the like. The resin system injected into the formation cures to form a consolidated mass which is substantially impermeable.

The present invention permits a zone to be plugged and abandoned without the need for drilling out residual material left in the wellbore, making the invention particularly attractive for use in wells having a plurality of completion zones and for wells in remote locations where rig time is extremely costly.

III. FURTHER DESCRIPTION OF THE INVENTION

The resin system stage employed in the present invention is conventional and may comprise any thermosetting resin and a suitable curing agent or catalyst appropriate for the resin employed, to provide a liquid system which can be injected into the formation to be treated in a single stage and which will cure in the formation to substantially reduce the permeability of the formation in the vicinity of the wellbore, preferably to a permeability of about 0.01 millidarcy or less. Since such a resin system does not require a separate overflush or preflush to react, such a resin system is sometimes referred to as "internally catalyzed" in the parlance of the oilfield, though in practice most such systems employ a second polyfunctional monomer rather than a catalyst in the literal sense of the term catalyst. Thus, suitable resin systems based on phenolic resins, furan resins, furfural alcohol resins, vinyl ester resins, and the like may be employed as those skilled in the art will appreciate. However, epoxy resin type systems are preferred. Epoxy systems are generally more readily compatible with water likely to be present in the formation, and once set, have excellent chemical stability under typical formation conditions. Numerous embodiments according to the present invention are available using epoxy systems which give excellent performance using materials which are readily available at reasonable cost and which with routine precautions, are relatively safe to workers, to equipment, and to the environment during transportation, storage, and use. Accordingly, the invention will be more particularly described with reference to epoxy based systems, though it is to be understood that the invention is not to be limited thereby.

Epoxy resins suitable for use in the present invention comprise those organic materials possessing more than one epoxy group. Examples of the polyepoxides include, 1,4-bis(2,3-epoxypropoxy) benzene, 1,3-bis(2,3-epoxypropoxy) benzene, 1,4'-bis(2,3-epoxypropoxy) diphenyl ether, 4,4'-bis(2-methoxy-3,4-epoxybutoxy) diphenyl dimethylmethane, and 1,4-bis(2-methoxy-4,5-epoxypentoxy) benzene.

Other examples of resins suitable for use herein are glycidyl-type epoxy resins such as those described by Lee et al. in *Handbook of Epoxy Resins,* McGraw-Hill, 1967, Chapter 2.

Specific examples include the epoxy polyethers of polyhydric phenols obtained by reacting a polyhydric phenol with a halogen-containing epoxide of dihalohydrin in the presence of an alkaline medium. Polyhydric phenols that can be used for this purpose include resorcinol, catechol, hydroquinone, methyl resorcinol, or polynuclear phenols, such as 2,2-bis(4-hydroxyphenyl) propane (bisphenol A), 2,2-bis(4-hydroxyphenyl) butane, 4,4'-dihydroxybenzophenone, bis(4-hydroxyphenyl) ethane, 2,2-bis(4-hydroxyphenyl) pentane, and 1,5-dihydroxynapthalene. The halogen-containing epoxides may be further exemplified by 3-chloro-1,2-epoxybutane, 2-bromo-1,2-epoxyhexane, 3-chloro-1,2-epoxyoctane, and the like. Such polymeric products may be represented by the general formula:

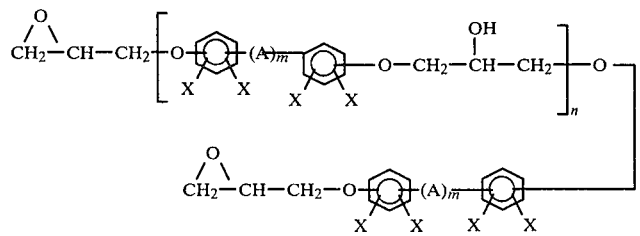

wherein each A is independently a divalent hydrocarbon radical having from 1 to 6 carbon atoms, —S—, —S—S—,

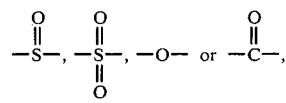

each X is independently hydrogen, an alkyl group of from 1 to 6 carbon atoms, chlorine or bromine, m has a value of zero or 1, and n has an average value from zero to about 20.

The above-described preferred glycidyl polyethers of the dihydric phenols may be prepared by reacting the required proportions of the dihydric phenol and the epichlorohydrin in the presence of a caustic such as sodium hydroxide or potassium hydroxide to neutralize the hydrochloric acid formed during reaction. Th reaction is preferably accomplished at temperatures within the range of from about 50° C. to 150° C. The heating is continued for several hours to effect the reaction and the product is then washed free of salt and base.

Another group of polyepoxides that may be used comprises the glycidyl ethers of novolak resins, polynuclear polyhydroxy phenols, which are obtained by condensing an aldehyde with a polyhydric phenol in the presence of an acid catalyst. Further prepartation of novolak resins is described by T. S. Carswell in Phenoplasts, page 29 et seq. (1947). Typical members of this class are represented by the formula:

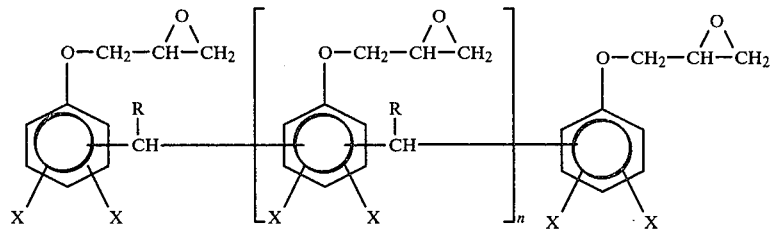

wherein each R is independently hydrogen or an an alkyl group from 1 to 4 carbon atoms, each X is independently hydrogen, an alkyl group of from 1 to 6 carbon atoms, chlorine, or bromine, and n has an average value of from 0 to about 20.

A number of curing agents are known which harden unset epoxy resins. See generally Chapters 5 through 12 of the Lee et al. text. Specific classes of curing agents include, for example, amines, dibasic acids and acid anhydrides. The preferred hardening agents are the amines, especially those having a plurality of amino hydrogen groups. Included are aliphatic, cycloaliphatic, aromatic or heterocyclic polyamines, such as diethylene triamine, ethylene diamine, triethylene tetramine, dimethylamino propylamine, diethylamino propylamine, piperidine, methane diamine, triethyl amine, benzyl dimethylamine, dimethy amino methyl phenol, tri(dimethylaminomethyl) phenol, a-methylbenzyl dimethylamine, meta-xylene diamine, 4,4'-dimethylenedianiline, polymethylene polyphenylamine, pyridine, and the like. Mixtures of various amines may be employed. The amines or other curing agent react rather slowly to convert the polyepoxides to an insoluble form. A suitable curing agent and concentration thereof best suited for a particular well can easily be determined by a knowledge of temperature conditions and available working time, i.e. length of time between adding the curing agent and final positioning of the resin-containing mixture in the formation.

The curing agent can be employed in an amount ranging from about 40 to more than about 125 percent, preferably about 70–110 percent and more preferably about 85–100 percent, of that stoichiometrically required.

Preferably, the resin and curing agent are admixed in a mutual solvent to provide a solution which is easily pumped and which can be readily injected into the formation. Too much solvent, however, can result in incomplete plugging or prolonged cure times. Those skilled in the art will be able to select a suitable solvent and solvent ratio depending on the choice of resin and curing agent. For example, for epoxy systems, suitable diluents are discussed generally in Chapter 13 of the Lee et al. text hereinabove cited. The solvent may be, for example, an organic alcohol, ester, ether, ketone, acetate, etc., and mixtures thereof. Specific solvents include, for example, 2-(2-ethoxyethoxy)-ethanol, ethyl acetate, amyl acetate, methyl ethyl ketone, methylisobutyl ketone, xylene, ethylene glycol, n-butyl ether, alkylene glycol alkyl ethers such as ethylene glycol ethyl ether, diethylene glycol isobutyl ether, and the like. Specific examples of suitable combinations of solvents include xylene/ethylene glycol ethyl ether e.g. in a 1.5:1 to 0.3:1 weight ratio, and toluene/ethylene glycol ethyl ether.

A most preferred resin system according to the present invention comprises about 20–65 weight percent ethylene glycol ethyl ether, most preferably about 20–30 weight percent, and the balance an approximately stoichiometric blend of D.E.R. 331 brand epoxy resin, which is a liquid epoxy resin of the bisphenol-A/epichlorohydrin type having an average epoxide equivalent weight of about 190, and Jeffamine AP22 brand polymethylene polyphenylamine, which has an average —NH equivalent weight of about 51.5.

The second essential step in the present invention is the injection into the wellbore of a liquid containing at least one chain stopping compound to react with at least one component of the resin system to prevent any residual resin system material in the wellbore from setting up in the wellbore. Preferably, the second liquid includes a mutual solvent for the resin system components, for the chain stopping compound, and for the reaction product of the resin system components with the chain stopping compound.

A most preferred embodiment when employing the most preferred resin system hereinabove described is a 5 to 50 and more preferably 15–25 weight percent solution of an alkanol primary amine such as monoethanolamine in an alkylene glycol alkyl ether such as ethylene glycol ethyl ether. The concentration of monoethanolamine in the glycol ether is not sharply critical. Monoethanolamine itself is not a particularly effective cosolvent for the partially polymerized epoxy monomer, so that use of lesser amounts of solvent may give a rather viscous fluid in the wellbore. The use of greater amounts of solvent is constrained only by practical limitations on treatment logistics such as the volume of the wellbore. Although monoethanolamine has two —NH sites, when present in a suitable excess, reaction of the first hydrogen with the an epoxy functional group on the resin is so much more rapid than the reaction of the second site, that the monoethanolamine functions as a chain stopping compound by tying up the reactive sites on the epoxy molecule, thereby preventing hardening of the resin in the wellbore. Other primary and secondary monofunctional amines (i.e. a single $RNH_2$ or $R_2NH$ group, optionally with non-reactive substiuents on R) may also be employed to cap the chain by reaction with the epoxy sites, as may monobasic acids. Alternatively, the liquid employed in the second step may contain a component to stop the crosslinking reaction by tying up reactive sites on the crosslinker. Thus, for example, a monofunctional epoxy reactive diluent such as those taught in Chapter 13, pages 13-7 through 13-10 of the Lee et al. text may be employed.

Those wishing to employ resin systems other than epoxy resins will readily be able to select suitable chain stopping compounds appropriate for the particular resin system employed.

Also, the liquid employed in the second essential step of the present invention preferably contains a fluid loss additive to minimize loss of the fluid from the wellbore into the formation. The invention may be practiced without use of a fluid loss additive, provided care is used to avoid injecting too much of the chain stopping solution into the wellbore—or equivalently, over displacing a slug of the chain stopping stage—so that a significant amount of the chain stopping material enters the formation. Obviously, injection of significant quantities of the chain stopping fluid into the formation would interfere with the setting of the resin in the formation, and should therefore be avoided. A suitable fluid loss additive is a mixture of a cellulose compound which is soluble in the liquid of said second stage, and a finely divided inert particulate in relative proportions such that fluid loss control is imparted to the fluid. By "soluble" in the context of the cellulose compound is meant sufficiently dispersible to form a stable, visually uniform dispersion at the concentration employed. Ethylcellulose and higher homologs which are water insoluble, organic soluble cellulose derivatives, are preferred. A suitable inert particulate is finely divided silica, i.e. silica flour. Preferably, the particulate has a particle size diameter within the range of from about 1 to about 100 microns.

Preferably, the set inhibiting liquid contains from about 0.2 to about 4.5 percent of the cellulose derivative, e.g. ethylcellulose, and about 0.04 to about 0.75 percent of the inert particulate, by weight of the liquid. Quantities near the upper ends of the ranges are generally employed where the formation is relatively permeable, whereas lesser amounts are satisfactory where the formation is relatively tight. Most preferably, from about 1.25 to about 3.3 percent of ethylcellulose and about 0.18 to about 0.55 percent of silica flour are employed, e.g. about 100–300 lbs of an approximately 6 parts ethylcellulose to one part silica flour mixture per 1000 gallons of fluid.

The following treatment according to the present invention has been proposed to a well operator wishing to plug off a zone in an offshore well producing water through perforations at a depth of 7758–7782 feet. The treatment can be carried out without use of a drilling rig. The well is a multiple completion zone well equipped with a 7-inch, 26 lb/ft liner from 6207 feet to total depth, and the zone of interest isolated by packers at 7628 ft and 7820 ft. After shutting off the perforations at 7758–7782 feet, the well operator wishes to perforate at another depth but still within the same area isolated by the packers at 7628 and 7820 feet. 2⅜-inch, 4.7 lb/ft EUE tubing extends from the surface to the 7628 ft packer, and another tubing string of the same size extends through the zone of interest to another zone below the 7820 ft. packer.

To divert treatment fluids from that portion of the liner extending from the bottom of perforations to the top of the lower packer, 1.25 bbls of heavy brine (e.g. 11 lb/gal calcium chloride brine) is first spotted in the wellbore through coil tubing. To clean the formation, 500 gallons of a 50:50 15% HCl:xylene acid dispersion as taught in U.S. Pat. No. 3,794,523 is injected and displaced with 40 bbls filtered sea water and 10 bbls of diesel oil. Although not essential, the diesel oil or similar hydrocarbon displacement fluid will be employed because the working time of the particular resin system is shortened somewhat by contact with fresh water, sea water, or acid. Alternatively, a lower alkyl alcohol may be used in lieu of part or all of the diesel oil. The foregoing optional steps are not part of the invention per se, but are recommended to clean the formation and thereby achieve optimum sealing performance.

The resin system is to be prepared by bringing to the well site, a solution of 80 weight percent D.E.R. 331 brand epoxy resin and 20 percent ethylene glycol ethyl ether, and another solution of 60 weight percent Jeffamine AP22 brand polymethylene polyphenylamine in 40 percent ethylene glycol ethyl ether. The resin system is to be prepared by adding 0.4 parts by volume of the polymethylene polyphenylamine solution to 1 part of the epoxy resin solution and admixing same for about 10–15 minutes. Seventeen hundred gallons of the above mentioned internally catalyzed resin system—enough to penetrate radially at least about three feet around the wellbore over the perforated interval—is to be injected down the tubing and displaced into the formation with 500 gallons of a mixture of 1 part by weight monoethanolamine, 4 parts by weight ethylene glycol ethyl ether, and 150 pounds of a 6:1 weight mixture of ethylcellulose and silica flour. Finally, the set inhibiting fluid may be displaced to depth with 22.8 bbls of filtered seawater, or a sufficient lesser volume to balance the formation pressure. The resin system may, if desired, be separated from the set inhibiting fluid by a wiper plug to wipe the tubing substantially clean from the surface to the 7628 foot packer and also to minimize mixing of the set inhibiting fluid with all but the final portion of the resin system. Using the wiper plug, the theoretical minimum volume of set inhibiting liquid to be employed would be the volume between the packer at 7628 feet where the wiper plug would fall free and the surface of the heavy brine initially spotted below the perforations. However, an excess is preferably employed to assure an adequate volume to contact exposed well equipment. In lieu of the filtered seawater, other suitable displacement fluids may be employed for the final displacement such as diesel oil, nitrogen, and the like. The well will then be shut in for about 12 hours to permit the internally catalyzed resin system to set up in the formation, after which time coil tubing will be inserted and the isolated portion of the well flushed clean. The new zone will then be perforated at the new location desired by the operator and conventional stimulation and sand control treatments carried out through the new perforations.

What is claimed is:

1. A composition for preventing a resin system from setting up in a wellbore comprising:
    (a) from about 5 to about 50 parts by weight an alkanol primary amine;
    (b) from about 95 to about 50 parts by weight an alkylene glycol alkyl ether, (a) and (b) together totalling 100 parts by weight;
    (c) from about 0.2 to about 4.5 parts by weight a water insoluble cellulose derivative which is dispersible in the mixture of (a) and (b); and
    (d) from about 0.04 to about 0.75 parts by weight a finely divided inert particulate, (c) and (d) functioning to control fluid loss of said composition.

2. The composition of claim 1 wherein (a) is monoethanolamine.

3. The composition of claim 1 wherein (b) is ethylene glycol ethyl ether.

4. The composition of claim 1 wherein (c) is ethylcellulose.

5. The composition of claim 1 wherein (d) is silica flour.

6. The composition of claim 1 wherein (c) is a higher homolog of ethylcellulose.

7. The composition of claim 1 wherein (a) is monoethanolamine, (b) is ethylene glycol ethyl ether, (c) is ethylcellulose, and (d) is silica flour having a particle size diameter within the range of from about 1 to about 100 microns.

8. The composition of claim 7 containing from about 15 to about 25 parts by weight monoethanolamine and from 85 to about 75 parts by weight ethylene glycol ethyl ether, and, by weight of the liquid, from about 1.25 to about 3.3 percent ethylcellulose and about 0.18 to about 0.55 percent silica flour.

* * * * *